(12) United States Patent
Sassin et al.

(10) Patent No.: US 6,249,576 B1
(45) Date of Patent: Jun. 19, 2001

(54) TELEPHONE DIRECTORY INFORMATION SYSTEM WITH CALL PLACEMENT CAPABILITY

(75) Inventors: Michael Sassin, San Jose; Neal J. King, Oakland, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/047,305

(22) Filed: Mar. 24, 1998

(51) Int. Cl.[7] .......................... H04M 3/42; H04M 11/00; H04L 12/28; H04L 12/66
(52) U.S. Cl. .......................... 379/201; 370/352; 370/401; 379/93.23; 379/216; 379/900
(58) Field of Search .................... 379/93.23, 201, 379/216, 242, 900, 93.17, 355, 356; 370/352, 401, 353, 354, 355, 356

(56) References Cited

U.S. PATENT DOCUMENTS

| | | | |
|---|---|---|---|
| 5,903,631 | * | 5/1999 | Smith et al. ...................... 379/355 X |
| 5,960,442 | * | 9/1999 | Pickering .......................... 379/201 X |
| 5,999,609 | * | 12/1999 | Nishimura ............................ 379/201 |
| 6,091,808 | * | 7/2000 | Wood et al. ...................... 379/242 X |
| 6,097,793 | * | 8/2000 | Jandel .............................. 379/201 X |

\* cited by examiner

*Primary Examiner*—Harry S. Hong

(57) ABSTRACT

A system and method for providing directory information with a call completion feature includes a data network server located on a data network for establishing a connection between a first communication device and a second communication device. The network server is configured to transmit a search command signal in response to a search command request and to transmit an establish-connection command signal in response to an establish-connection request, the establish-connection command signal being necessary to establish the connection between the first and second communication devices. A database is connected to the network server and is configured to transmit a first telephone number to the server in response to the search command signal. In a preferred embodiment, the establish-connection command signal is transmitted to a computer connected to the server, causing the computer to dial the first telephone number, thereby establishing the connection between the first and second communication devices. In another preferred embodiment, the establish-connection command signal is transmitted from the server to a telephone switch, causing the telephone switch to establish the connection between the first and second communication devices. In alternative embodiments, the system may be implemented over an internet protocol (IP) telephony connection or via any known network.

11 Claims, 7 Drawing Sheets

TELEPHONE DIRECTORY INFORMATION SYSTEM WITH CALL PLACEMENT CAPABILITY

BACKGROUND OF THE INVENTION

The invention relates generally to a method and system for providing telephone directory information. More particularly, the invention relates to a web-based telephone directory information system with call placement capability.

DESCRIPTION OF THE RELATED ART

Telecommunications play a vital role in modern society, especially in the business sector. As markets have continued to become more globalized, telecommunications have grown more vital in maintaining channels of communication between remotely located individuals and corporations engaged in business. With the growing reliance on telecommunications, a premium is placed on efficiency in accessing telephone number information and setting up telephone calls.

One of the longest standing sources of telephone directory information is a telephone book. The directory information is stored in an accessible format by providing, for instance, separate business, residential, and governmental agency listings. Often business listings will also be presented alphabetically by business classification. A telephone book is limited, however, by the geographical area for which it provides information. Although it is possible to access directory information for any given geographical area by simply obtaining the telephone book encompassing that area, a collection of telephone books can quickly become unwieldy.

Telephone-accessible directory information services are also available. These services provide an advantage over telephone books in that the service is not necessarily limited to a particular geographical area. A caller can access a telephone number assigned to a telephone in any location, provided that a service has been established for that location. Typically, a caller will call the number of a directory information service provider, identify the name and perhaps an address of the called party, and the service provider will access the telephone number from a database.

U.S. Pat. No. 5,369,685 to Kero describes a refinement of the above-described telephone-accessible directory service wherein, subsequent to accessing the telephone number of the called party, the service provider places the telephone call to the called party for the user.

Telephone directory information services are now also available on-line over a data network, such as the World Wide Web of the Internet. The service enables a user to enter the name of a party to be called and, optionally, the city and address where the party resides. The user transmits the information to the server supporting the web site of the service provider, and the server accesses information that includes the telephone number of the called party. The server then transmits the telephone number to the user. The user can then make the telephone call to the party based upon the transmitted search results.

What is needed is a web-based directory information system having a call placement capability which allows a user to perform a telephone number search from a computer and to connect to the called party without having to make a separate telephone call.

SUMMARY OF THE INVENTION

A directory information system with call completion capability includes a data network server located on a data network for establishing a connection between a first communication device and a second communication device. The network server has two modes of operation, namely a search mode and an establish-connection mode. Within the search mode, the network server responds to a search request transmitted by a computer over the data network by transmitting a search command signal. During the establish-connection mode, the network server responds to an establish-connection request by transmitting an establish-connection command signal. The server is connected to a memory device which stores data, including a first telephone number assigned to the first communication device. The memory device responds to the search command signal transmitted by the network server by transmitting the first telephone number to the network server.

In a preferred embodiment, a connection between a requesting computer and the network server is configured to relay the search request and the establish-connection request from the computer to the server. The connection is further configured to relay the establish-connection command signal from the server to the computer. The establish-connection command signal includes instructions directing the computer to dial the first telephone number to establish the connection between the first communication device and the second communication device, which is typically a second telephone. In this embodiment, the connection is triggered from the server, but is established from the computer that requested the directory information.

Another embodiment of the invention includes the server configured to transmit the establish-connection command signal to a telephone switch, the establish-connection command signal including the first telephone number and instructions directing the switch to establish a connection between the first and second communication devices based upon the first telephone number. In this embodiment, the first communication device may be a first telephone and the second communication device is a second telephone connected to the computer. The establish-connection command signal further includes instructions to the switch to transmit a busy signal to the server if a line connected to the first telephone is off-hook. The server is configured to transmit a busy signal message to the computer upon receipt of the busy signal from the telephone switch.

The server is also configured to transmit a monitor command signal to the telephone switch in response to a monitor request signal transmitted from the computer. The monitor command signal includes instructions to the telephone switch, directing the switch to activate a ringer on the second telephone upon the line connected to the first telephone becoming available and to place a call from the second telephone to the first telephone if the second telephone goes off-hook while the ringer is activated.

A method for providing telephone directory information with a call completion feature includes receiving a data transmission via a data network, the transmission including a search request for the telephone number assigned to the first communication device. The telephone number is accessed from a telephone directory database and is transmitted over the data network. A request is received to establish a telephonic connection between the first communication device and the remotely located second communication device based upon the transmitted telephone number. A connection is then established between the first communication device and the second communication device based upon the request to establish the connection.

DETAILED DESCRIPTION

Figure 1:
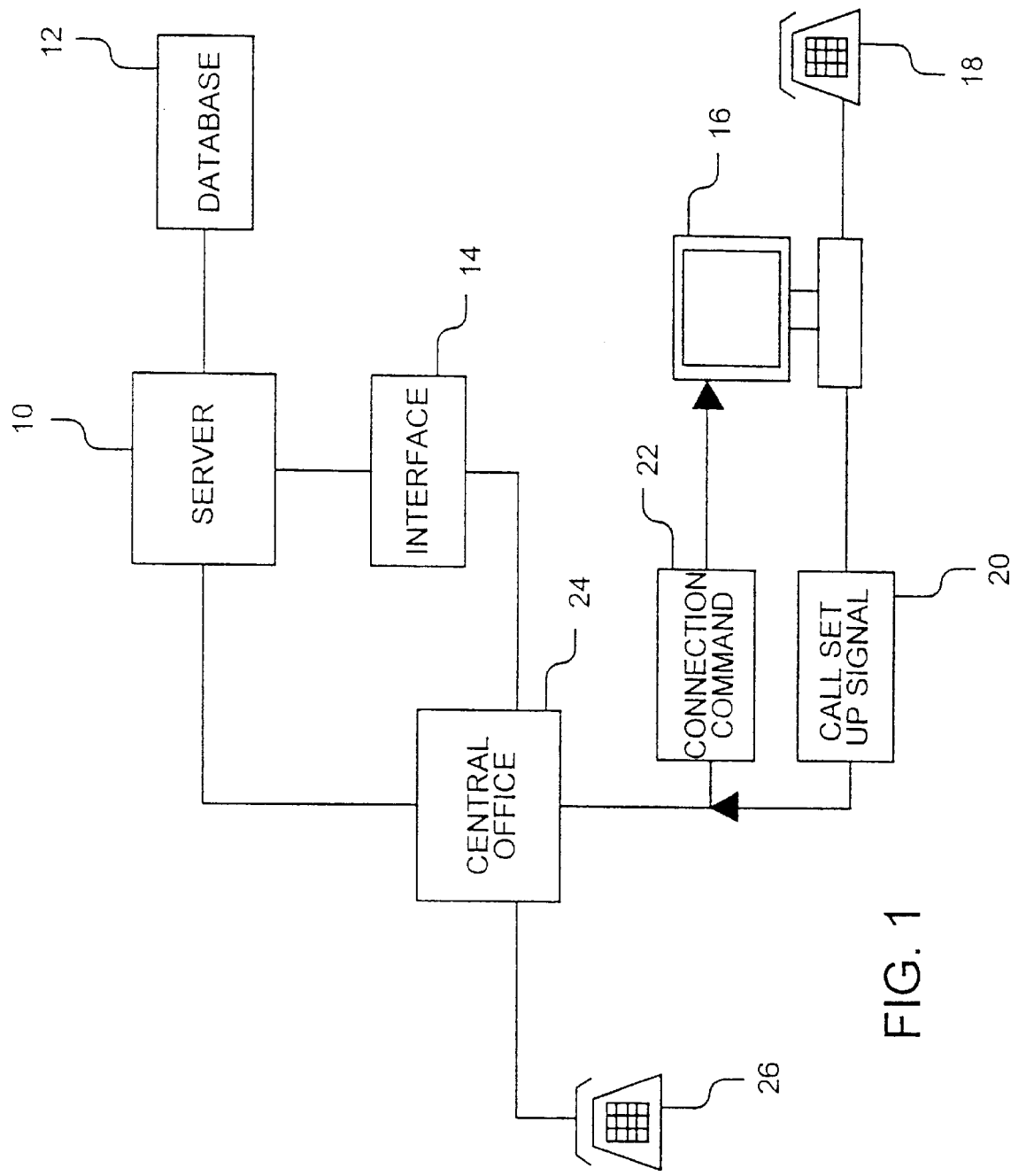
FIG. 1 is a block diagram illustrating a first preferred embodiment of a web-based telephone directory information system according to the present invention.

With reference to FIG. 1, a preferred embodiment of a telephone directory information system with call completion capability includes a data network server 10 connected to a database 12. The network server 10 is connected to a central office 24 via an interface 14 which reformats signaling information transmitted by the server 10 into a format compatible for processing by the central office 24. Preferably, the network server 10 is connected to the World Wide Web of the Internet and supports a web site which provides a graphic user interface for a user of the telephone directory information system. Thus, the interface 14 may represent an Internet Service Provider (ISP).

The database 12 stores telephone directory information, including a telephone number assigned to a first telephone 26. A computer 16 is connected to the data network server 10 via a data communications link supported by the central office 24. The computer 16 is connected to a second telephone 18 and is configured to dial telephone numbers to set up calls for the second telephone. Although the second telephone 18 is illustrated as a stand-alone device, the telephone could also be integrally constructed into the computer 16. The data link between the computer 16 and the server 10 enables the computer 16 to access the web site supported by the network server 10.

The data link which supports the transmission of data between the computer 16 and the network server 10 can be an analog telephone line or a digital telephone line. The data transmitted between the computer 16 and the server 10 during operation of the telephone directory information system includes a first web page of the web site transmitted by the server after a user of the computer 16 directs a message to the server 10 requesting the first web page. The first web page may include a set of prompts which instruct the user to enter information regarding the party to whom the user wishes to place a call, the prompts including a name entry blank, a city entry blank, and an address entry blank. The user transmits the information to the server 10 together with a request to perform a search of the database 12 using parameters containing the called party information.

The search request is received by the server 10, which then transmits a search command signal to the database 12. The database 12 stores files in a memory of local exchange carrier (LEC) customers, including information such as the name and address of the customers. If a customer is a business, the file might include a classification by type of business. Thus, a user could perform a search, for instance, to obtain the telephone numbers of all hardware stores within a particular zip code. A search of the database 12 is performed and, in the example illustrated by FIG. 1, a first telephone number assigned to the first telephone 26 is accessed. The first telephone number is transmitted to the server 10, which transmits the telephone number to the computer 16. The computer receives the telephone number in the form of search results, possibly, if the search parameters were broad, together with other telephone numbers assigned to other LEC customers. Optionally, the results might be encoded so that the name of the called party is displayed, but not the telephone number assigned to the party. In this manner, the directory can provide a limited degree of privacy to customers listed in the database directory. That is, the telephone number of the customer could not be disseminated as though it were published in a telephone book. However, a user can access the telephone number by searching the database and directing the network server 10 to complete the call without ever having actually become aware of the telephone number.

The user can select the first telephone number from the search results to complete a call to the first telephone 26. The selection can be made by clicking on the text of the first telephone number utilizing a mouse, not shown, connected to the computer 16. Selecting the first telephone number causes the computer 16 to transmit a message to the network server 10, requesting the server to transmit a connection command signal 22 together with the first telephone number to the computer 16. The connection command signal includes instructions to the computer to disconnect the data link connecting the computer 16 and the server 10 and to dial the first telephone number. Disconnecting the computer is required to allow the computer 16 to transmit a call set up signal 20 to the central office 24 to set up a call to the first telephone. If the computer 16 and the second telephone are connected to separate phone lines, then disconnecting the computer 16 from the data link is unnecessary. The call set up signals are dual-tone-multifrequency (DTMF) signals if the telephone network is an analog telephone network. If the call is set up over a digital telephone network, the signals are digital call set up signals.

The connection between the second telephone 18 and the computer 16 can be configured such that the computer contains signaling circuitry in parallel with the signaling circuitry contained in the second telephone. Alternatively, the computer 16 might include an integrally constructed telephone.

Figure 2:
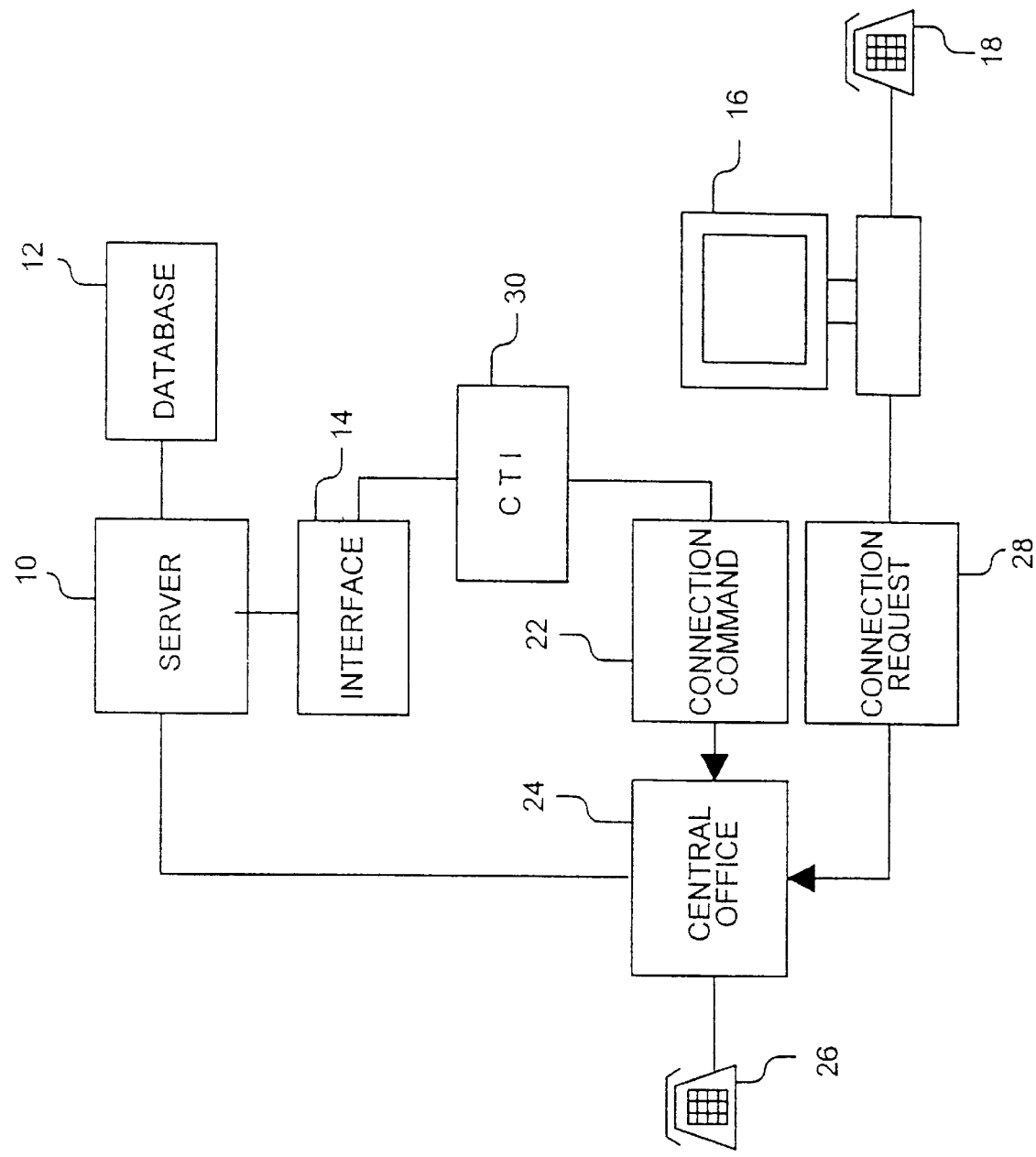
FIG. 2 is a block diagram illustrating a second preferred embodiment of the web-based telephone directory information system illustrated in FIG. 1.

With reference to FIG. 2, a second embodiment of the telephone directory system is shown wherein the server 10 is configured for communication with the central office 24 to direct the central office to establish the connection between the first telephone 26 and the second telephone 18. After the server 10 has transmitted the search results of the telephone number search, the user selects the first telephone number. Selecting the first telephone number causes the computer 16 to transmit a connection request signal 28 to the server 10 via the central office 24. The connection request signal 28 includes information directing the server 10 to establish the connection between the first telephone 26 and the second telephone 18. The server 10 transmits an establish-connection command signal 22 to an interface 14 positioned between the server 10 and the central office 24. The interface 14 reformats the establish-connection command signal and transmits the reformatted establish-connection command signal to the central office 24.

Preferably, the interface 14 conforms to the Common Channel Signaling System No. 7 (SS7) global standard for telecommunications defined by the International Telecommunications Union (ITU). Provided that the central office 24 is configured to execute a signaling protocol that conforms to the SS7 standard, the interface 14 is sufficient to enable the server 10 and the central office to exchange signaling information. If the central office 24 executes a signaling protocol that is not compatible with the SS7 signaling protocol executed by the interface 14, then a computer telephony interface (CTI) 30 can be utilized to establish a common signaling protocol for the exchange of signaling information between the server 10 and the central office 24.

The establish-connection command signal 22 includes instructions to the central office 24 to ascertain whether the line connecting the first telephone 26 to the central office switch is available and to communicate the line status to the server 10. If the central office 24 determines that the telephone is off-hook, the central office 24 transmits a busy message to the server 10, and the server 10 relays the busy message to the computer 16. The busy message might also include a prompt providing the user with an option to have the central office switch monitor the switch-to-first telephone connection to determine when the line becomes available and to complete the call from the second telephone 18 to the first telephone 26 at that time. If the user selects the call completion option, the central office 24 disconnects the data link between the computer 16 and the server 10, monitors the line to determine when the line becomes available, and transmits ring signals to the second telephone 18 when the line becomes available. If the second telephone 18 goes off-hook while the ringer is ringing, then the central office 24 puts the call through to the first telephone 26. The busy message might also include an option of disconnecting the data link without transmitting an establish-connection request to the central office 24. The user can then dial the first telephone number to establish the connection to the first telephone.

Figure 3:
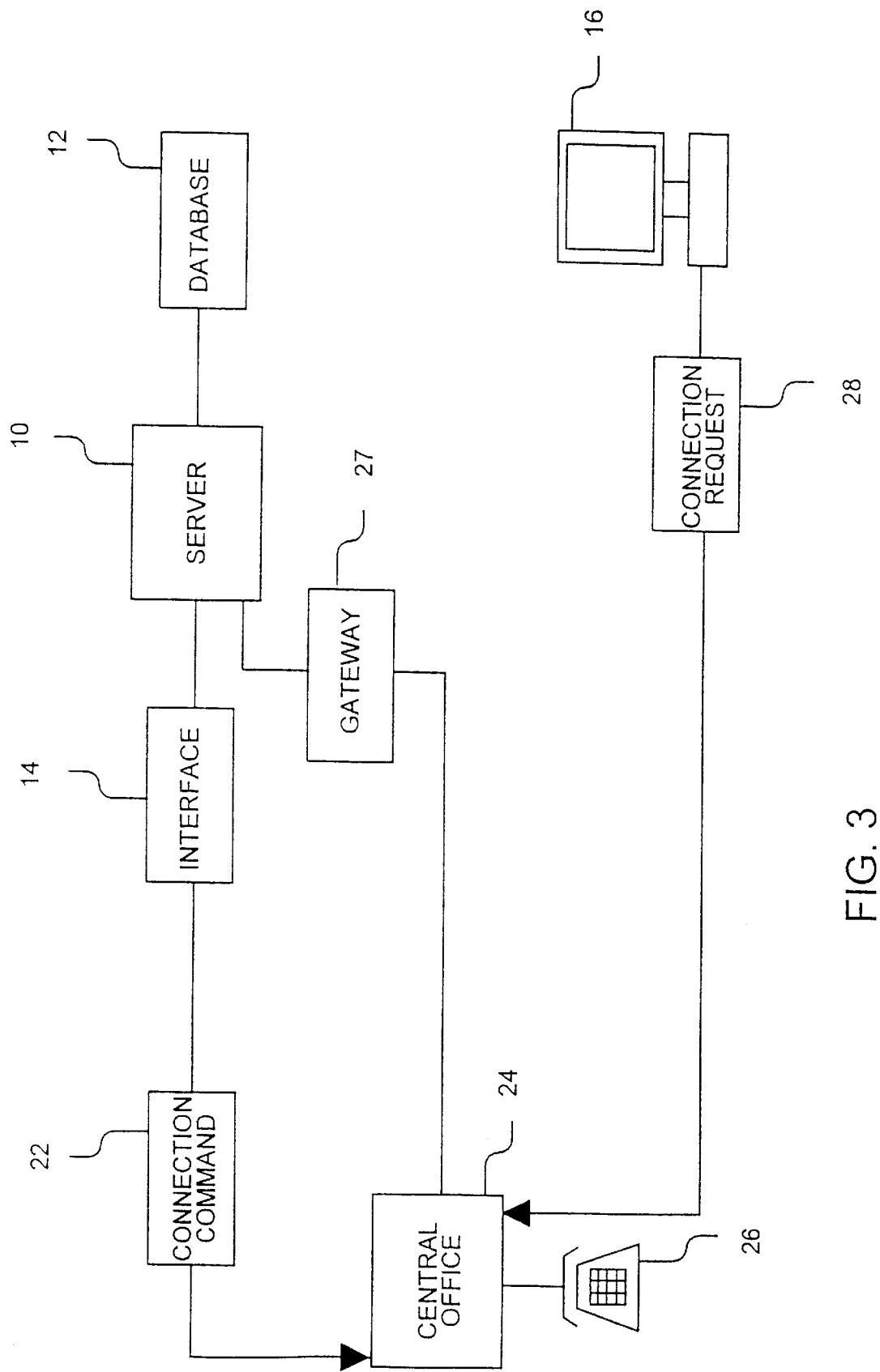
FIG. 3 is a block diagram illustrating an alternative embodiment of the system illustrated in FIGS. 1 and 2 which employs IP telephony.

Referring to FIG. 3, an alternative embodiment of the telephone directory information system which utilizes IP telephony includes a server 10 which is configured to facilitate an IP telephony connection between the first telephone 26 and the computer 16 which has IP telephony capability. After the telephone number search has been performed and the user has selected the number of the called party, the computer 16 transmits the selection of the telephone number in the establish-connection request signal 28 to the server 10. The server 10 is configured to respond to the establish-connection request signal 28 by transmitting an establish-connection command signal 22 via the interface 14 to the central office 24 which includes directions to establish a telephonic connection between the server 10 and the first telephone 26. The telephone connection between the first telephone 26 and the server 10 is supported by a gateway 27 which provides a conversion function enabling the telephonic connection to the first telephone 26 to be forwarded by the server 10 to the IP telephony-enabled computer 16 in the form of an IP telephony connection.

If the line to the first telephone is busy, the central office 24 transmits a busy message to the server 10. In response, the server 10 transmits a busy signal message to the computer 16. The message might include an option to direct the central office 24 to monitor the line and to establish the connection between the server 10 and the first telephone 26 when the line becomes available. If the server 10 determines that the line is available, the server 10 directs the central office 24 to establish a telephonic connection between the first telephone 26 and the server 10. The data link between the server 10 and the computer 16 enables the server 10 to forward the call from the server 10 to the computer 16 in the form of packetized IP telephony voice data. The gateway 27 between the central office 24 and the server enables voice information transmitted by the first telephone 26 in the form of telephonic voice signals to be converted and compressed into packetized IP telephony voice data for transmission over the data link. The gateway 27 also converts packetized IP telephony voice data transmitted from the IP telephony enabled computer 16 into digital voice information compatible for processing by the first telephone.

Figure 4:
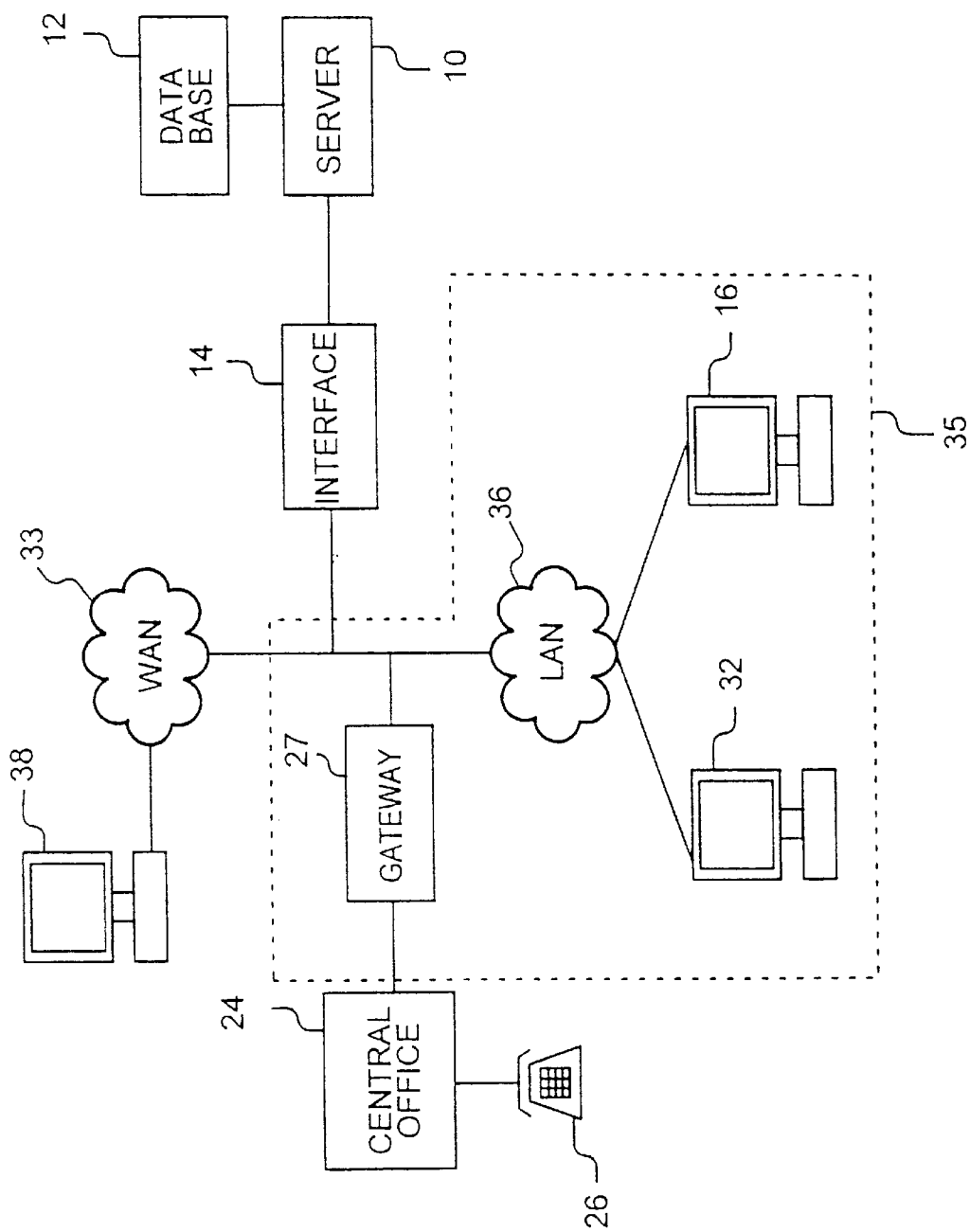
FIG. 4 illustrates a second alternative IP telephony embodiment of the system illustrated in FIG. 3.

Referring to FIG. 4, another alternative embodiment of the telephone directory information system includes the network server 10 connected to a local area network (LAN) 36 via an interface 14. The LAN 36 supports the computer 16, hereafter referred to as the first computer, and a third IP telephony-enabled computer 32. A gateway 27 converts packetized voice data transmitted from the first computer 16 into digital voice information compatible for processing by the central office 24. As in the previously described embodiments, the server 10 is configured for communication with the first computer 16 to enable a user of the computer 16 to perform a search of the database 12 for a telephone number of a called party. In the embodiment shown in FIG. 4, the called party can be a user of a second IP telephony-enabled computer 38, the third computer 32, or the second telephone 26.

The first and third computers 16 and 32 on the LAN 36 and the gateway 27 collectively comprise a virtual private branch exchange (PBX) 35. The virtual PBX 35 is a distributed packet based switch with multimedia capability. The network server 10 provides a controller-like functionality for the virtual PBX 35 by directing the gateway 27 or the first computer 16 to transmit messaging signals to the central office 24 and to the second IP telephony-enabled computer 38 via a wide area network (WAN) 33. The second computer 38 is connected to the virtual PBX 35 via the WAN 33. The WAN 33 can be broadly defined to include an internet service provider which connects to the second IP telephony-enabled computer via a second central office (not shown).

The embodiment of the telephone directory information system shown in FIG. 4 supports completion of an IP telephony call after the first computer 16 has selected a telephone number from the results of a telephone number search of the database 12. The IP telephony call might be an internal call, for instance to the third IP telephony-enabled computer 32 on the LAN 36, or the call might be an external call to the second IP telephony-enabled computer 38 via the WAN 33. In the first instance, the first IP telephony-enabled computer 16 transmits an establish-connection request signal to the server 10 to indicate, for instance, that the network address, the equivalent of a telephone number, assigned to the third computer 32 has been selected from the results of the search of the database 12. The server 10 transmits the network address assigned to the third computer 32 together with instructions directing the first computer 16 to utilize the network address to transmit call setup signals to establish an IP telephony link with the third computer 32 and, after the link is established, to route packetized voice information to the third computer 32.

To establish an IP telephony link from the first computer 16 to the second computer 38, the first computer 16 transmits an establish-connection request to the server 10 after the server 10 has performed the search and transmitted the results to the first computer 16. If the second computer resides on a remote LAN connected to the WAN 33, the establish-connection request transmitted by the first computer 16 includes a request for the network address of the second computer 38. The server 10 transmits the network address of the second computer 38 to the first computer 16 together with instructions for the first computer 16 to utilize the network address to transmit call setup signals to the second computer 38 to establish the IP telephony link.

If the user of the first computer 16 selects the telephone number of the first telephone 26, the server 10 transmits an establish-connection command signal to the virtual PBX 35 via the interface 14 to establish a telephonic connection between the first telephone 26 and the gateway 27, which makes the telephonic connection through the central office 24 to the first telephone 26. Voice information transmitted from the first telephone 26 is packetized by the gateway 27 and is relayed to the first computer 16 via an IP telephony link from the server 10.

Figure 5:
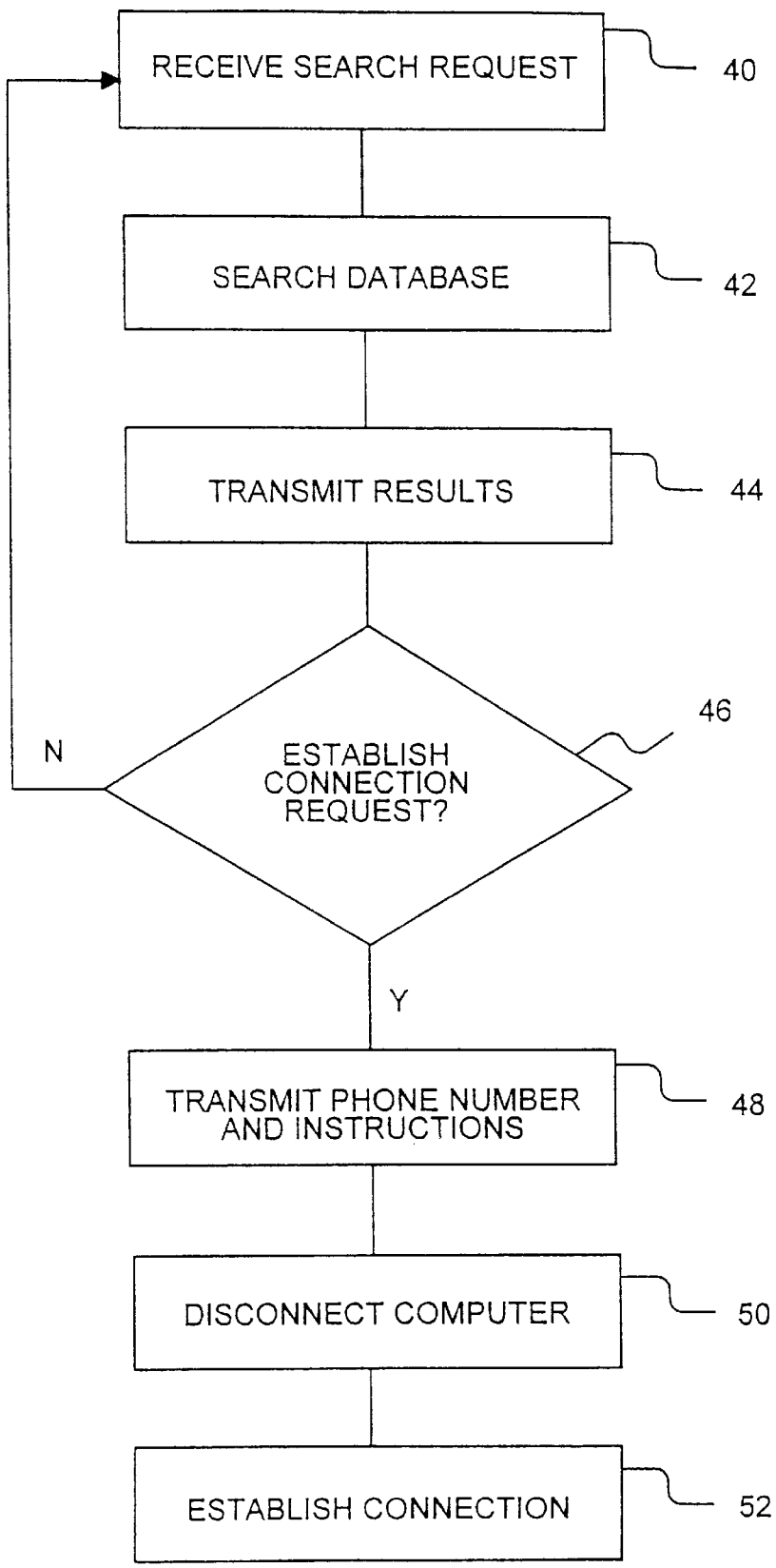
FIG. 5 is a flow diagram showing a method for providing telephone directory information utilizing the first preferred embodiment of the system shown in FIG. 1.

Referring to FIGS. 1 and 5, a method for providing telephone directory information includes receiving a telephone number search request signal from a computer 16 in step 40. As previously noted, in the preferred embodiment the search request signal is received by a network server 10 supporting a web site on the World Wide Web. Alternatively, the server 10 might support a data network such as a LAN. The search request signal is generated by a user of the computer 16 selecting a search option on a web page by, for instance, using a mouse to click on highlighted text on the web page. The server 10 responds to the search request signal by transmitting a search command signal to a database 12 in step 42. The database 12 transmits the results of the search to the server 10, and in step 44, the server 10 transmits the results of the search to the computer 16.

The results are transmitted to the computer 16 in a format which enables the user of the computer to select one of the telephone numbers to be transmitted to the server 10 to complete a call to a party assigned the selected number. The text of the telephone numbers representing the search results are highlighted, and the user selects the telephone number of the called party by clicking on the text of the called party's telephone number. Selection of a telephone number causes the computer 16 to transmit an establish-connection request signal to the server 10. The web page containing the results of the search includes, in addition to the telephone numbers generated by the search, an option to perform another search if none of the telephone numbers is assigned to the party the user desires to call. In step 46, the server 10 determines whether the computer 16 has transmitted an establish-connection request signal or a new search request. If a new search has been requested, the system is returned to step 40, where a search is requested.

If an establish-connection request signal is transmitted, the server 10 is configured to respond to the request in step 48 by transmitting the first telephone number assigned to the first telephone 26 with instructions to the computer 16 to disconnect the data link to the server 10 and to dial the first telephone number for the second telephone 18 connected to the computer 16. If the computer 16 and the second telephone 18 are connected to separate lines, it is unnecessary to disconnect the computer 16 from the data link. The computer disconnects from the data link to the server 10 in step 50 and dials the telephone number to establish the connection between the first telephone 26 and the second telephone 18 in step 52.

Figure 6:
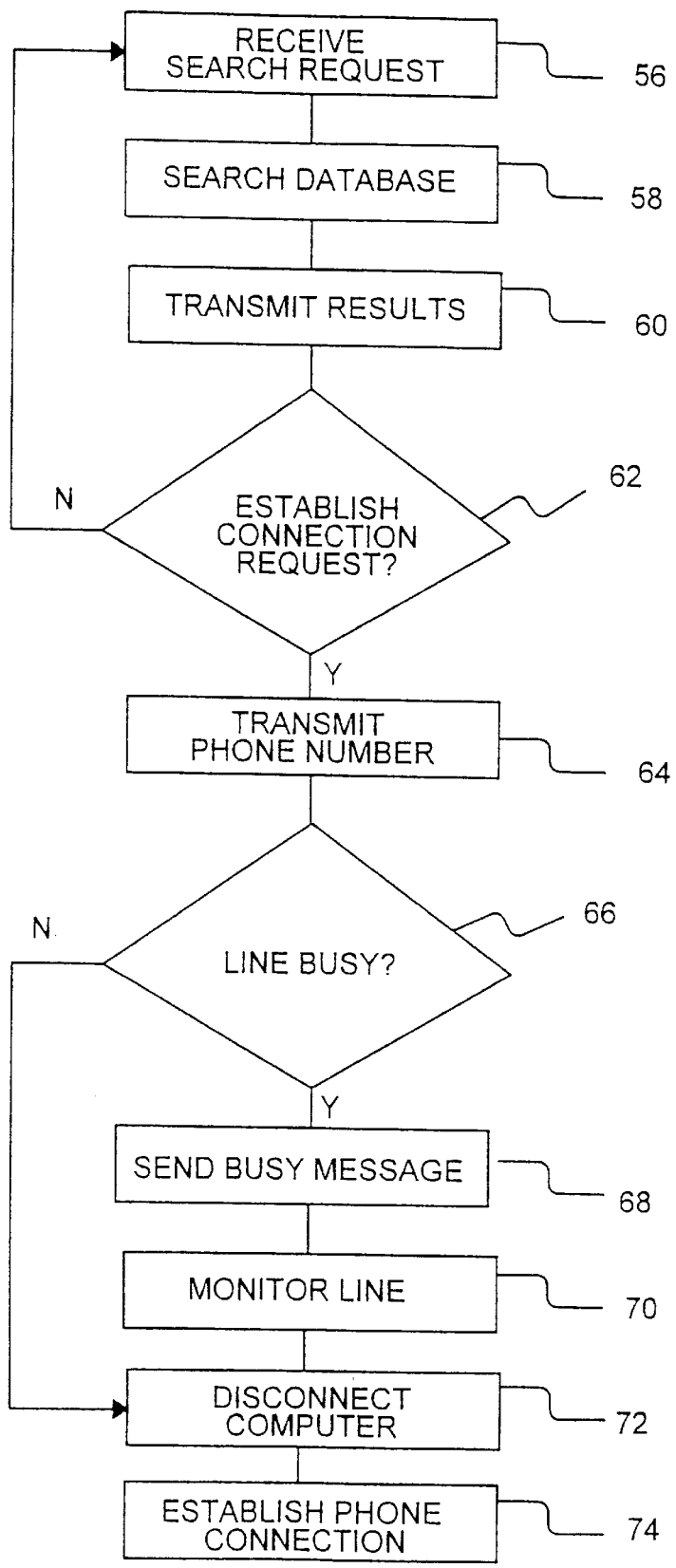
FIG. 6 is a flow diagram showing a method for providing telephone directory information utilizing the second preferred embodiment of the system illustrated in FIG. 2.

With reference to FIGS. 2 and 6, an alternative method for providing a web-based telephone directory information service with call completion capability includes receiving a search request from the computer 16 in step 56. The server 10 responds to the search request in step 58 by executing a search of the telephone directory database 12. The server 10 transmits the results of the search to the computer 16 in step 60. The server 10 determines whether an establish-connection request signal has been transmitted from the computer 16 in step 62. If a new search is requested, then steps 56 through 62 are repeated.

If the computer 16 transmits an establish-connection request signal in step 62, the server 10 is configured to respond by transmitting the selected telephone number to the central office 24 via the CTI interface 30 in step 64, together with instructions directing the central office 24 to determine the line status of a line connected to the first telephone 26 in step 66. If the line is not busy, the server 10 transmits an establish-connection command signal 22 which includes instructions to the central office 24 to disconnect 72 the computer from the data link to the server 10 and to establish 74 a connection between the first and second telephones 26 and 18.

If the line is determined to be busy in step 66, the central office 24 transmits a busy signal to the server 10 and the server relays the busy signal to the computer 16 in step 68. The message which relays the busy status information from the server 10 to the computer 16 includes an option to have the central office 24 monitor the line connected to the first telephone to determine when the line becomes available. If the monitor option is selected, the central office 24 monitors the line in step 70 until the line becomes available, at which time the central office 24 disconnects the computer from the data link in step 72 and activates the ringer on the second telephone 18. If the second telephone 18 goes off-hook while the ringer is activated, the central office puts through a call from the second telephone 18 to the first telephone in step 74 to establish the connection.

Figure 7:
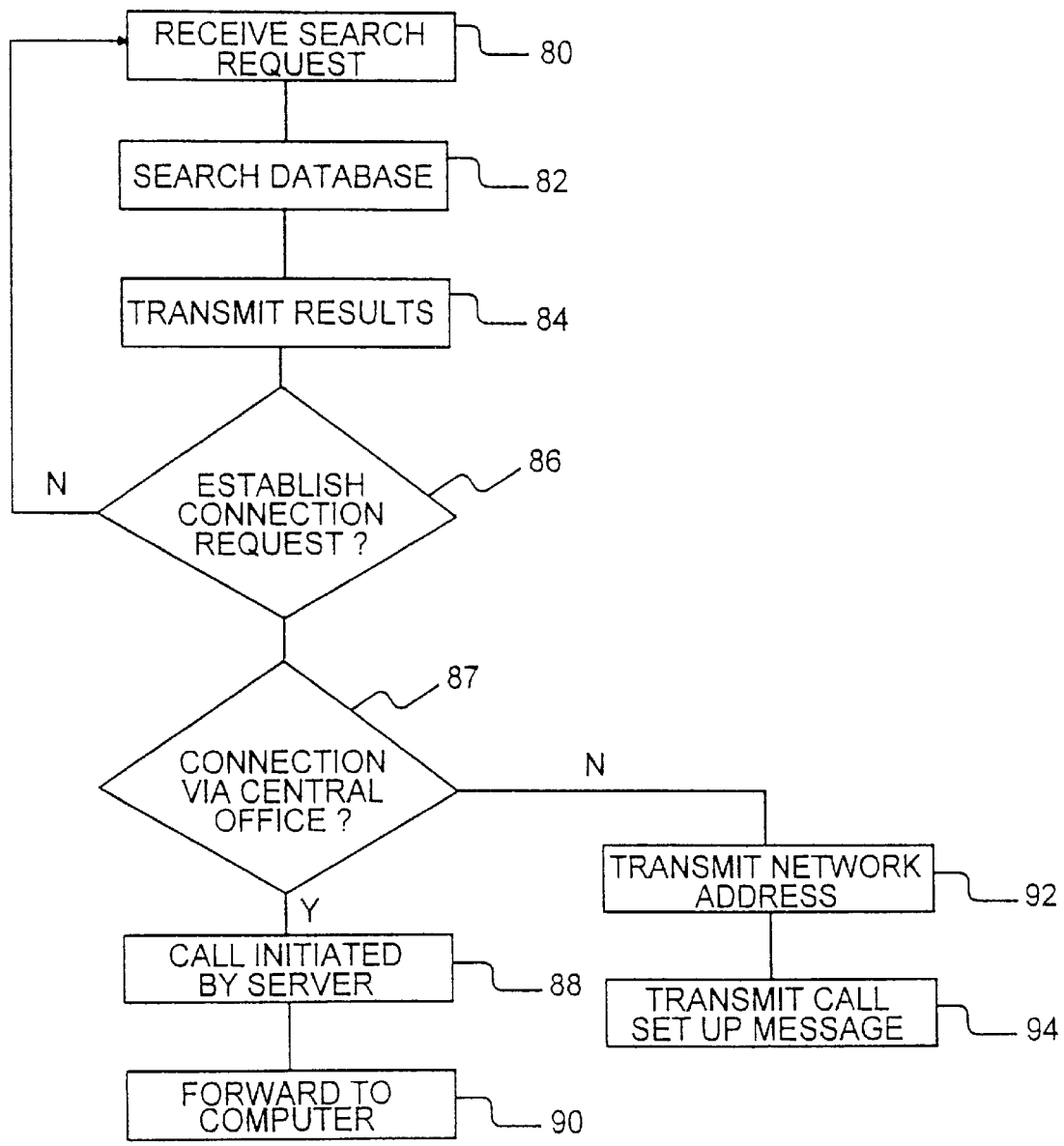
FIG. 7 is a flow diagram of a method for providing telephone directory information utilizing either alternative embodiment of the systems illustrated in FIGS. 3 and 4.

With reference to FIGS. 3, 4, and 7, a method for providing telephone directory information with IP telephony call completion capability includes the steps of receiving a search request in step 80, searching a telephone directory database in step 82, and transmitting the search results to an IP telephony-enabled first computer 16 in step 84. The server 10 determines whether an establish-connection signal has been received from the first computer in step 86. If a new search has been requested instead, then steps 80 through 86 are repeated.

If an establish-connection request is transmitted in step 86, a determination is made 87 as to whether the connection will be made through the central office 24. If the connection will be made through the central office 24, a call is initiated by the server 10 in step 88 to take place between the computer 16 of the virtual PBX 35 and the first telephone 26. This is achieved either by sending the phone number and a command to the first computer 16 or by using the CTI interface 30 to the virtual PBX 35 that will invoke the call as a third party call. All voice information received from the first telephone 26 is packetized by a gateway 27 for transmission 90 by the server 10 to the first computer 16 via the data link. In this manner, the call is forwarded 90 via an IP telephony connection to the first computer 16.

If it is determined in step 87 that the connection will not be made through the central office, the server 10 transmits 92 the network address of the called terminal to the first computer 16 together with instructions for the first computer 16 to transmit 94 a call setup message to the called terminal utilizing the network address to route the call setup messages. The network address is also utilized to route packetized voice data to the called terminal. If the connection is not routed through the central office 24, it is unnecessary for the gateway 27 to support a telephonic connection and to forward the telephonic connection to the computer 16 via an IP telephony link.

What is claimed is:

1. A telephone directory information system with call completion capability comprising:

a data network server located on a data network, said server being configured to cooperate in establishing a telephonic connection between a first communication device and a second communication device, said server having at least two modes of operation including a search mode and an establish-connection mode, said server being configured to transmit a search command signal in response to a search request received from a requesting source over said data network during said search mode, said server being configured to transmit an establish-connection command signal to said requesting source during said establish-connection mode in response to an establish-connection request received from said requesting source over said data network, said establish-connection command signal being specific to establishing said connection between said first communication device and said second communication device; and memory connected to said server, said memory having stored telephone directory information including a first telephone number assigned to said first communication device, said memory being responsive to said search command signal transmitted from said server, said search command signal triggering transmission of data indicative of said first telephone number to said server.

2. The system of claim 1 wherein said server is connected to a computer via said data network, said computer being said requesting source, said connection being configured to relay said search request and said establish-connection request from said computer to said server, said connection further being configured to relay said establish-connection command signal from said server to said computer, said establish-connection command signal including instructions compatible with operation of said computer to dial said first telephone number to establish said telephonic connection between said first communication device and said second communication device, said first communication device being a first telephone remotely located from said computer, said second communication device being a second telephone connected to said computer.

3. The system of claim 1 wherein said first telephone number stored in said memory comprises a network address assigned to said first communication device, said network address being included in said establish-connection command signal, said establish-connection command signal being transmitted to said second communication device, said second communication device being integrated with said requesting source and being an IP telephony-enabled computer, said IP telephony-enabled computer being configured to include said network address in voice information packets transmitted by said IP telephony-enabled computer subsequent to receipt of said network address from said server, said first communication device, said IP telephony-enabled computer, and said server all being connected to said data network.

4. The system of claim 1 wherein said server is connected to a computer via said data network, said computer being said requesting source, said connection being configured to relay said search request and said establish-connection request from said computer to said server, and further wherein said establish-connection command signal transmitted from said server includes said first telephone number assigned to said first communication device and instructions directing said computer to establish said connection between said first communication device and said second communication device based upon said first telephone number, said first communication device being a first telephone remotely located from said computer and said second communication device being a second telephone connected to said computer.

5. A method for providing telephone directory information comprising the steps of:

receiving a data transmission from a computer via a data network, including receiving a search request for a first telephone number assigned to a first communication device;

accessing said telephone number from a generally accessed telephone directory database;

transmitting data related to said telephone number accessed from said database to said computer via said data network;

transmitting a command to said computer via said data network to establish a telephonic connection that includes said first communication device, said first communication device being remotely located from said computer, said command being specific to said telephone number; and establishing said telephonic connection involving said first communication device as a response to said command to establish said connection, including utilizing said computer in initiating said telephonic connection.

6. The method of claim 5 wherein said step of establishing said connection includes transmitting said telephone number to said computer connected to a second communication device together with instructions directing said computer to dial said telephone number to set up a telephone call from said second communication device to said first communication device.

7. A telephone directory information system with a call completion capability comprising:

a data network server connected to a data network, said server being responsive to a telephone number search request, receipt of said search request from a requesting source triggering transmission of a search command signal from said server, said server including a control program enabling said server to transmit an establish-connection command signal to establish a connection between a first communication device and a second communication device, said server being configured to transmit partial search results to said requesting source while disabling detection of telephone numbers at said requesting source;

a database having memory storing generally accessible telephone directory information, including a first telephone number assigned to said first communication device, said memory being responsive to said search command signal transmitted by said server, receipt of said search command signal triggering transfer of said first telephone number to said server; and a network interface having an input connected to said server and an output connected to a telephone switch, said input being configured to receive said establish-connection command signal, said establish-connection command signal having a format incompatible for processing by said telephone switch, said output being configured to transmit a reformatted establish-connection command signal having a format compatible for processing by said telephone switch.

8. The system of claim 7 wherein said establish-connection command signal transmitted by said server to said telephone switch includes an instruction to set up a connection between said first communication device and said server, said control program enabling said server to forward said call to said second communication device via said data network, said second communication device being said requesting source and being a computer enabled for IP telephony.

9. The system of claim 7 wherein said establish-connection command signal transmitted by said server to said telephone switch includes an instruction to establish said telephonic connection between said first communication device and said second communication device, said second communication device being a second telephone.

10. The system of claim 9 wherein said establish-connection command signal further includes an instruction directing said telephone switch to determine a line status of a line connected to said first communication device and to transmit a busy signal to said server if said line is busy, said control program enabling said server to relay said busy signal via said data network to said requesting source, said requesting source being a computer connected to said second communication device.

11. The system of claim 10 wherein said server is responsive to a monitor request signal transmitted by said computer in response to said busy signal, said monitor request signal triggering transmission of a monitor command signal from said server, said monitor command signal including an instruction directing said telephone switch to activate a ringer on said second telephone upon said line becoming available.

\* \* \* \* \*